United States Patent [19]

Buchwald et al.

[11] 4,318,057
[45] Mar. 2, 1982

[54] OPTICALLY PUMPED ISOTOPIC AMMONIA LASER SYSTEM

[75] Inventors: Melvin I. Buchwald, Santa Fe; Claude R. Jones, Los Alamos, both of N. Mex.; Leonard Y. Nelson, Seattle, Wash.

[73] Assignee: The United States of America as represented by the United States Department of Energy, Washington, D.C.

[21] Appl. No.: 47,550

[22] Filed: Jun. 4, 1979

[51] Int. Cl.³ .................. H01S 3/05; H01S 3/094; H01S 3/223

[52] U.S. Cl. ............................ 372/70; 372/3; 372/55; 372/72; 372/102; 372/103

[58] Field of Search ............... 331/94.5 G, 94.5 P, 331/94.5 C

[56] References Cited

U.S. PATENT DOCUMENTS 4,140,978  2/1979  Bisehel et al. ............... 331/94.5 G
4,196,403  4/1980  Fry ............................... 331/94.5 P

OTHER PUBLICATIONS

Chang et al., "Off-Resonant Infrared Laser . . . Inversion", Appl. Phys. Lett., vol. 28, #9, 5/1/1976.
Fry, "Optically Pumped Multi-Line $NH_3$ Laser", 12/76, pp. 320-324, Optics Communications, vol. 19, #3.
Thielman et al., "Determination of . . . in $NH_2D$", 10/15/74, pp. 461-463, Appl. Phys. Lett., vol. 25, #8.
Tangonan et al., "Stark Tuned . . . of $N^{15}H_2D$ with $CO_2$ Laser Lines", pp. 179-181, Appl. Phys. Lett., vol. 29, #3.
Freed et al., "Absolute Frequency . . . $CO_2$ Isotope Laser Transitions", 12/76, pp. 431-437, IEEE Trans. on Inst. & Meas., vol. IM25, #4.
Buchwald, "Studies in Energy Transfer . . .", 1973, 144 pages, Thesis Cornell University, #73-14.733.
Harrison et al., "High Power Laser . . . Ammonia Laser", 2/77, pp. 225-228, Optics Communic., vol. 20, #2.
Chang et al., "Laser Action . . . Pumped $NH_3$", 5/1/76, pp. 526-528, Appl. Phys. Lett., vol. 28, #9.
Jones et al., "Ammonia Laser . . . HF Laser", 1/78, pp. 27-30, Optics Communications, vol. 24, #1.
Jones, "Two-Photon . . . $^{15}NH_3$ . . . Coincidence", pp. 279-287, Journ. of Malec. Spectrosc., vol. 70, 1978.
Thielman, "Study of Saturated . . . $NH_2D$, Using a $CO_2$ Laser", 176 pp. Thesis, University of Idaho, 1974.

Primary Examiner—Nelson Moskowitz
Attorney, Agent, or Firm—William W. Cochran, II; Paul D. Gaetjens; James E. Denny

[57] ABSTRACT

An optically pumped isotopic ammonia laser system which is capable of producing a plurality of frequencies in the middle infrared spectral region. Two optical pumping mechanisms are disclosed, i.e., pumping on R(J) and lasing on P(J) in response to enhancement of rotational cascade lasing including stimulated Raman effects, and, pumping on R(J) and lasing on P(J+2). The disclosed apparatus for optical pumping include a hole coupled cavity and a grating coupled cavity.

10 Claims, 5 Drawing Figures

OPTICALLY PUMPED ISOTOPIC AMMONIA LASER SYSTEM

This invention arose out of a contract between Mathematical Sciences Northwest, Inc. and the Department of Energy and a contract between the Los Alamos Scientific Laboratory and the Department of Energy.

BACKGROUND OF THE INVENTION

The present invention pertains to lasers and more particularly to lasers pumped by optical coherent light sources.

Single photon optical pumping of $NH_3$ with $CO_2$ lasers in the 9 μm region has been successfully performed by T. Y. Chang and J. D. McGee as reported in Appl. Phys. Letts. 28, 526 (1976) and S. M. Fry, Opt. Comm. 19, 320 (1976). As reported, laser emission occurs in the 12 μm wavelength region. Even more recently, 1 megawatt pulses from ammonia pumped with 5 to 7 megawatt $CO_2$ pulses were obtained by R. G. Harrison et al. as reported in the Proceedings of London Conference on Laser Spectroscopy, May 1977.

As a result of the high output powers and high efficiencies (~20%) obtained by optically pumping the ammonia molecule with a $CO_2$ laser, interest has spread to producing other frequencies in the middle infrared region from the $v_2$ to ground state transition ($v_2 \rightarrow 0$) in ammonia. However, the quantum nature of the lasing transitions of the molecules plus the restrictive selection rules for determining allowable pump and corresponding lasing frequencies limits the frequencies and range of frequencies available.

SUMMARY OF THE INVENTION

The present invention overcomes the disadvantages and limitations of the prior art by providing an optically pumped isotopic ammonia laser. A plurality of frequencies in the mid ir region are produced by varying the isotope of ammonia and utilizing various isotopic $CO_2$ lasers operating on both conventional lasing bands and hot bands as well as conventional and isotopic $CS_2$ lasers. Of particular interest is lasing produced near 628 $cm^{-1}$ by optically pumping $^{15}ND_3$ at 841.6 $cm^{-1}$ or 860.42 $cm^{-1}$.

It is therefore an object of the present invention to provide an optically pumped isotopic ammonia laser system.

It is also an object of the present invention to provide a high output power, optically pumped isotopic ammonia laser system.

Another object of the present invention is to provide a high efficiency, optically pumped isotopic ammonia laser system.

Another object of the present invention is to provide an optically pumped isotopic ammonia laser system which lases near 628 $cm^{-1}$.

Other objects and further scope of applicability of the present invention will become apparent from the detailed description given hereinafter. The detailed description, indicating the preferred embodiment of the invention, is given only by way of illustration since various changes and modifications within the spirit and scope of the invention will become apparent to those skilled in the art from the detailed description. The Abstract of the Disclosure is for the purpose of providing a nonlegal brief statement to serve as a searching and scanning tool for scientists, engineers, and researchers, and is not intended to limit the scope of the invention as disclosed herein, nor is it intended to be used in interpreting or in any way limiting the scope or fair meaning of the appended claims.

DETAILED DESCRIPTION OF THE PREFERRED EMBODIMENT OF THE INVENTION

Figure 1:
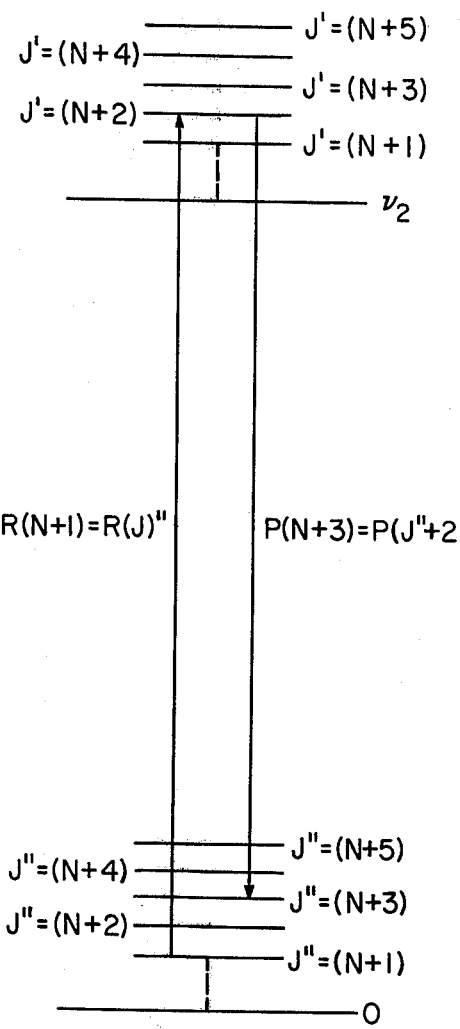
FIG. 1 is an energy level diagram illustrating conventional optical pumping on R(J) and lasing on P(J+2).

FIG. 1 is an energy level diagram illustrating, in general terms, optical pumping between the ground state and $v_2$ vibrational state on the R(J) rotational transition with lasing occurring on the P(J+2) transition. As shown, an optical pumping frequency is selected R(J") which pumps from the rotational state J"=(N+1) in the ground vibrational state to the J'=(N+2) in the $v_2$ vibrational state. The optical pumping frequency is consequently referred to as R(N+1) where N is an integer value. For example, if R(11) is pumped, FIG. 1 illustrates that the rotational state accessed by the pumping frequency in the $v_2$ vibrational band must necessarily be J'=12. Similarly, if lasing occurs on P(J+2) the frequency of the output line must necessarily be the frequency difference between J'=12 and J"=13. The selection rules illustrated in FIG. 1 illustrate a primary mechanism in which lasing occurs in molecules, such as isotopic ammonia, in response to coherent optical pumping.

Figure 2:
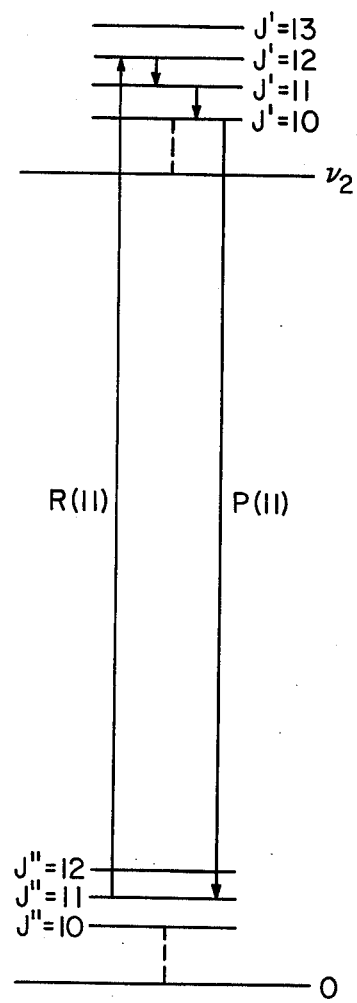
FIG. 2 is an energy level diagram illustrating pumping on R(J) and lasing on P(J) as a result of rotational cascade lasing in the far infrared.

FIG. 2 illustrates the manner in which rotational cascade lasing including stimulated Raman effects occurs in response to coherent optical pumping. According to the mechanism illustrated in FIG. 2, isotopic ammonia gas is pumped on R(11) and subsequently lases on P(11). This occurs as a result of utilizing an optical resonant cavity which enhances rotational cascade lasing including stimulated Raman effects in the far infrared from J'=12 to J'=11 and from J'=11 to J'=10. Various criteria are conducive to enhancing rotational cascade lasing including stimulated Raman effects, including colinear pumping geometry, internal cavity optics (excluding Brewster windows) and, a sufficiently large cavity Fresnel number in the far infrared (~100 μm) to support oscillation at the long wavelengths in the far infrared.

Figure 3:
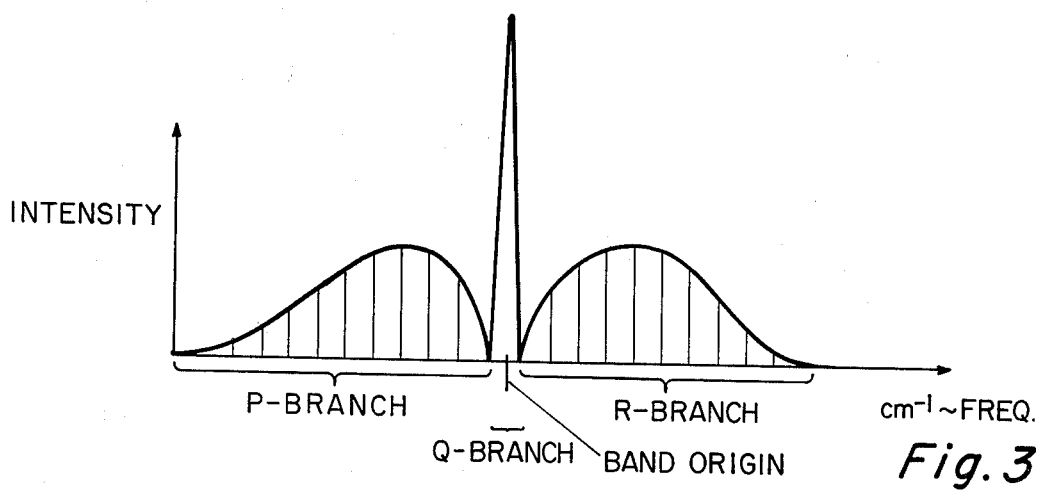
FIG. 3 is a spectrum of emission diagram illustrating the P, Q and R branches.

FIG. 3 is a spectrum of emission diagram illustrating the P, Q and R branches wherein the intensity of emission is plotted along the ordinate and frequency along the axis. From the spectrum of emission diagram, the band origin of various ammonia gas isotopes can be determined. For example, the band origin for $NH_3$ is approximately 950 $cm^{-1}$ while the band origin for $^{15}ND_3$ is approximately 750 $cm^{-1}$. By adjusting the band origin according to the isotopic ratio of the molecular medium, optical pumping and lasing frequencies are adjusted to provide various additional frequencies in the mid ir region. In other words, a slight change in mass of the molecule causes the molecule to vary its natural vibration frequency, thereby altering the coherent optical pumping frequency illustrated in FIGS. 1 and 2. This technique, therefore, provides a method of tuning the molecular medium to provide desired output frequencies.

Figure 4:
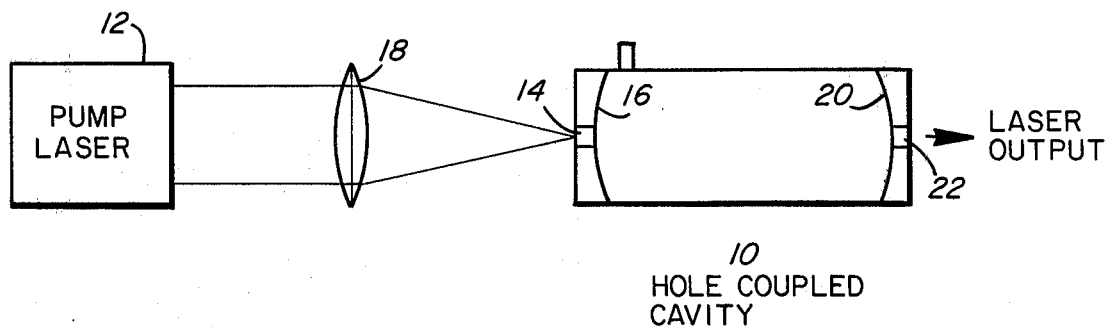
FIG. 4 is an optical pumping arrangement utilizing a hole coupled cavity.

FIG. 4 illustrates an optical pumping arrangement utilizing a hole coupled cavity 10. Pump laser 12 provides a coherent optical pumping source which is focused on hole 14 in reflector 16 via lens 18. Reflectors 16 and 20 are typically metal reflectors or other reflectors for enhancing oscillations in the far infrared as well as middle infrared frequency regions. Hole 22 in reflector 20 provides an output for the optically pumped laser emission.

Figure 5:
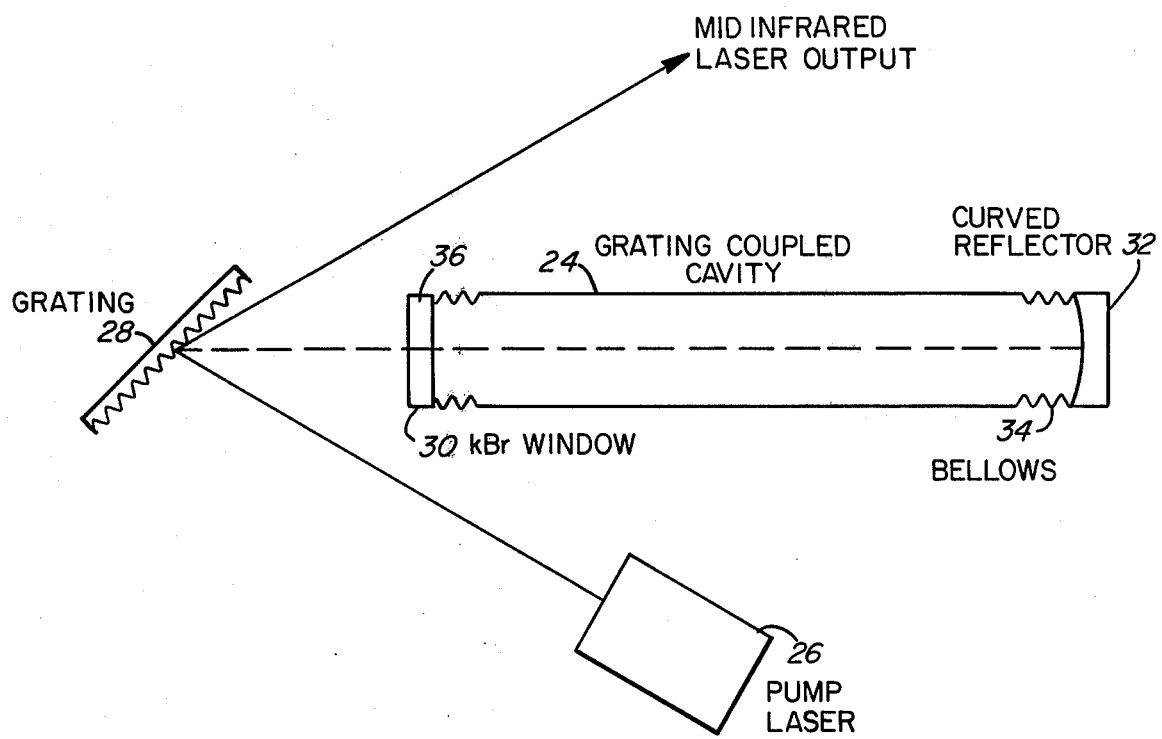
FIG. 5 is an optical pumping arrangement utilizing a grating coupled cavity.

FIG. 5 illustrates another optical pumping arrangement utilizing a grating coupled cavity 24. Pump laser 26 is directed towards grating 28 which directs the pump laser output towards the grating coupled cavity 24. The grating coupled cavity 24 comprises a KBr window 30 which has low reflectivity in the mid ir, moderately high reflectivity in the far ir and additionally, absorbs far ir radiation. Curved reflector 32 has high reflectivity for both mid ir and far ir radiation. Bellows 34 and 36 allow alignment of curved reflector 32 and KBr window 30, respectively.

In operation, the laser pump signal is directed through the grating coupled cavity 24 by grating 28. The reflectivity of KBr window 30 and curved reflector 32 to far ir radiation, causes the mechanism of FIG. 2 to be operative. Far ir radiation which builds up in the grating coupled cavity 24 is absorbed by the KBr window 30. Mid ir radiation, e.g., near 16 μm radiation, is emitted from the grating coupled cavity 24 due to the low reflectivity of KBr window 30 to mid ir frequencies. The mid ir radiation is diffracted by grating 28 as shown in FIG. 5.

Of course, various pump lasers can be used to provide the various pump frequencies required to produce desired output frequencies according to the mechanisms illustrated in FIGS. 1 and 2. Table I illustrates various $CO_2$ lasers and the transitions on which they operate to produce the disclosed optical pumping frequency. For each optical pumping frequency and its assigned transition, the assigned absorption transition, emission transition and output frequency are noted for the isotopic molecular ammonia gas being pumped. Table II similarly shows various $CS_2$ laser pump frequencies for various forms of isotopic ammonia gas. It should be noted that the first three examples of Table I and the first four examples of Table II operate according to the mechanism illustrated in FIG. 2, i.e., pumping on R(J) and lasing on P(J). For example, in the first example of Table I pumping occurs on R(6) while lasing occurs on P(6). To obtain the desired output frequency, it is necessary in the remaining examples to operate according to the mechanism illustrated in FIG. 1, i.e., pumping on R(J) and lasing on P(J+2). This can be achieved by introducing optical components in the optical cavity which would block or discriminate against far ir generation. For example, a Brewster angle salt window such as KCl or KBr can be used in the optical cavity to suppress far ir lasing such that the laser mechanism consists primarily of the steps shown in FIG. 1.

TABLE I

| Pump Laser | | Optically Pumped Gaseous Medium | | |
|---|---|---|---|---|
| $^{12}CO_2$ | | | | |
| Laser 00°1 → [10°0,02°0]$_{II}$ | | | $^{14}NH_3$ | |
| Transition | Pump 1/λ(cm$^{-1}$) | Absorption | Emission | Lases (cm$^{-1}$) |
| R(16) | 1075.98 | aR(6,0) | aP(6,0) | 819.6 |
| R(30) | 1084.62 | sR(5,0) | sP(5,0) | 867.3 |
| $^{13}CO_2$ | | | | |
| 01'1 → [03'0,11'0]$_I$ (Hot Band) | | | $^{15}ND_3$ | |
| Transition | Pump 1/λ(cm$^{-1}$) | Absorption | Emission | Lases (cm$^{-1}$) |
| P(27) | 860.42 | sR(11,k) | sP(11,k) | ~628 |
| $^{14}C^{16}O_2$ | | | | |
| High Pressure 00°1 → [10°0,02°0]$_I$ | | | $^{15}ND_3$ | |
| Transition | Pump 1/λ(cm$^{-1}$) | Absorption | Emission | Lases (cm$^{-1}$) |
| near P(30) | 841.6 | sR(9,k) | sP(11,k) | ~628 |
| $^{14}C^{18}O_2$ | | | | |
| 00°1 → [10°0,02°0]$_I$ | | | $^{15}ND_3$ | |
| Transition | Pump 1/λ(cm$^{-1}$) | Absorption | Emission | Lases (cm$^{-1}$) |
| P(58) | 841.306 | sR(9,k) | sP(11,k) | ~628 |
| $^{14}C^{18}O_2$ | | | | |
| Hot Band Line 01'1 → [11'0,03'0]$_I$ | | | $^{15}ND_3$ | |
| Transition | Pump 1/λ(cm$^{-1}$) | Absorption | Emission | Lases (cm$^{-1}$) |
| | 841 to 842 | sR(9,k) | sP(11,k) | ~628 |
| $^{14}C^{17}O_2$ | | | | |
| 00°1 → [1°00,02°0]$_I$ | | | $^{15}ND_3$ | |
| Transition | Pump 1/λ(cm$^{-1}$) | Absorption | Emission | Lases (cm$^{-1}$) |
| P(30)-P(58) | 841 to 842 | sR(9,k) | sP(11,k) | ~628 |

TABLE II

| Pump Laser | | Optically Pumped Gaseous Medium | | |
|---|---|---|---|---|
| $CS_2$ Laser (00°1 → 10°0) | | | $^{14}ND_3$ | |
| Transition | Pump 1/λ(cm$^{-1}$) | Absorption | Emission | Lases (cm$^{-1}$) |
| P(16) | 873.72 | aR(12,k) | aP(12,k) | 620 |
| R(28) | 883.16 | aR(13,k) | ap(13,k) | 610 |
| R(40) | 885.3 | sR(13,k) | sP(13,k) | 611 |
| $CS_2$ (00°1 → 10°0) | | | $^{15}ND_3$ | |
| Transition | Pump 1/λ(cm$^{-1}$) | Absorption | Emission | Lases (cm$^{-1}$) |
| R(6) | 878.8 | sR(13,k) | sP(13,k) | 607.3 |
| Isotopic $^{13}C^{32}S^{34}S$ (00°1 → 10°0) | | | $^{15}ND_3$ | |
| Transition | Pump 1/λ(cm$^{-1}$) | Absorption | Emission | Lases (cm$^{-1}$) |
| | ~842 | sR(9,k) | sP(11,k) | ~628 |

Of course, use of $CO_2$ lasers as illustrated in Table I is preferable to the use of $CS_2$ lasers as illustrated in Table II, since the highly developed technology of $CO_2$ lasers as well as the reliable, efficient and high power output of the $CO_2$ laser provides a better optically pumped laser system. Moreover, the use of an isotopic form of ammonia gas for producing a wide range of mid infrared frequencies provides a pumping medium with the ability to produce high output powers and conversion efficiencies as is apparent from the results produced by optically pumped $NH_3$, as disclosed above.

Obviously many modifications and variations of the present invention are possible in light of the above teachings. For example, KBr is not necessarily the best window material for the arrangement of FIG. 5; other materials may be superior, depending on various laser parameters, e.g., the wavelengths of the far infrared laser lines. It is therefore to be understood that within the scope of the appended claims, the invention may be practiced otherwise than as specifically described.

What is desired to be secured by Letters Patent of the United States is:

1. An optically pumped laser system comprising:
   deuterated molecular ammonia gas;
   laser excitation means for optically pumping R(J) of the $O \rightarrow \nu_2$ vibration transition in said deuterated molecular ammonia gas;
   optical resonant cavity means for enhancing lasing on P(J) of the $\nu_2 \rightarrow O$ vibrational transition of said deuterated molecular ammonia gas by enhancing rotational cascade lasing including stimulated Raman effects in the far infrared.

2. The laser system of claim 1 wherein said deuterated molecular ammonia gas comprises $^{15}ND_3$.

3. The laser system of claim 1 wherein said laser excitation means comprises a $^{13}C^{16}O_2$ hot band laser which functions on the P(27) line of the vibrational transition:
   $01'1 \rightarrow (1\ 1'0 + 03'0)_I$ in $^{13}C^{16}O_2$.

4. The laser system of claim 1 wherein said laser excitation means comprises a $CS_2$ laser.

5. The laser system of claim 2 wherein said laser excitation means comprises a $^{13}C^{16}O_2$ hot band laser which functions on the P(27) line of the vibrational transition:
   $01'1 \rightarrow (1\ 1'0 + 03'0)_I$ in $^{13}C^{16}O_2$.

6. The laser system of claim 2 wherein said laser excitation means comprises a $CS_2$ laser.

7. A laser system for producing near 628 $cm^{-1}$ radiation comprising:
   molecular $^{15}ND_3$ gas;
   a hot band $^{13}C^{16}O_2$ laser means for producing coherent pump radiation from the transition:
   $01'1 \rightarrow (1\ 1'0 + 03'0)_I$
   to pump the R(J) rotational state of the $O \rightarrow \nu_2$ vibrational transition of said molecular $^{15}ND_3$ gas;
   optical resonant cavity means for retaining said molecular $^{15}ND_3$ gas and enhancing lasing on the P(J) rotational state of the $\nu_2 \rightarrow O$ vibrational transition of said molecular $^{15}ND_3$ gas by enhancing rotational cascade lasing including stimulated Raman effects in the far infrared.

8. The laser system of claim 7 wherein said optical resonant cavity comprises:
   a mirror reflective to both middle and far infrared radiation;
   a KBr window having high reflectivity and absorption characteristics for far infrared radiation and low reflectivity and absorption characteristics for near 628 $cm^{-1}$ radiation.

9. A method for producing coherent radiation from molecular $^{15}ND_3$ gas comprising the steps of:
   producing a coherent optical pumping signal having a frequency suitable for pumping the R(J) rotation state of the $O \rightarrow \nu_2$ vibration transition in said $^{15}ND_3$ gas;
   forming an optical resonant cavity around said molecular $^{15}ND_3$ gas suitable for enhancing lasing on the P(J) rotational state of the $\nu \rightarrow O$ vibrational transition of said molecular $^{15}ND_3$ gas by enhancing rotational cascade lasing including stimulated Raman effects in the far infrared in response to said coherent optical pumping signal;
   applying said coherent optical pumping signal to said molecular $^{15}ND_3$ gas within said optical resonant cavity to produce said coherent radiation.

10. A method for producing coherent radiation from molecular $^{15}ND_3$ gas comprising the steps of:
   producing a coherent optical pumping signal having a frequency suitable for pumping the R(J) rotation state of the $O \rightarrow \nu_2$ vibration transition in said $^{15}ND_3$ gas;
   forming an optical resonant cavity around said molecular $^{15}ND_3$ gas in response to said coherent optical pumping signal;
   applying said coherent optical pumping signal to said molecular $^{15}ND_3$ gas within said optical resonant cavity to produce said coherent radiation.

* * * * *